Figure 1:
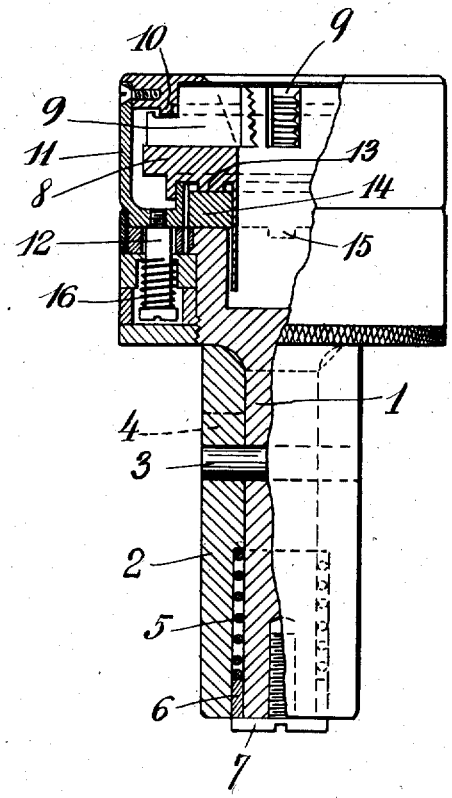

P. B. OATMAN.
SCREW CUTTING DIE.
APPLICATION FILED APR. 26, 1912.

1,045,598.

Patented Nov. 26, 1912.

Witnesses:
Peter A. Roe
H. C. Egan.

Inventor
Paul B. Oatman,
By his Attorneys
Edwards, Sager & Wooster.

UNITED STATES PATENT OFFICE.

PAUL B. OATMAN, OF NEW YORK, N. Y., ASSIGNOR TO IDEAL OPENING DIE COMPANY, A CORPORATION OF NEW YORK.

SCREW-CUTTING DIE.

1,045,598.  Specification of Letters Patent.  Patented Nov. 26, 1912.

Application filed April 26, 1912. Serial No. 693,341.

*To all whom it may concern:*

Be it known that I, PAUL B. OATMAN, a citizen of the United States, residing at New York, in the county of New York and State of New York, have invented certain new and useful Improvements in Screw-Cutting Dies, of which the following is a full, clear, and exact specification.

This invention relates to screw cutting dies for use in automatic screw cutting machines, and has particular reference to an improved mounting of a pull-off form of die, whereby, in case the feed of the screw machine should not exactly coincide with the pitch of the screw being cut by the dies, the dies will not be accidentally released.

By pull-off types of dies, I refer to expanding dies wherein the head or a part thereof is pulled longitudinally to release a clutch or other device, and thereby to permit the dies to expand to disengage from the work. In using an expanding die of this type in an automatic screw machine, it will be understood that the automatic screw machine is ordinarily "cammed" or adjusted so that it will feed the work exactly in proportion to the pitch of the screw thread being cut by the dies. If the pitch of the thread being cut by the dies is faster than the feed of the cam, it will be seen that the die head will be pulled loose from the clutching means which holds it against rotation, and the dies in contracted position, thereby releasing the dies and causing them to automatically open. If the reverse is true, the die head will tend to jam and not open promptly when it should, either of these contingencies being objectionable and causing considerable delay and expense. In ordinary practice, to avoid these contingencies, it has been necessary to "cam" or adjust the feed of the automatic screw machine so that it would feed exactly equal to the pitch of the dies, which is a difficult operation, requiring considerable time and carefulness on the part of the operator, and even then, in the case of a long screw, likely to either cause premature operation of the die head or delay operation. The practice has, therefore, commonly been to cam the screw machine as closely as possible, but to permit it to feed slightly slower than the dies, so that the die head would pull off prematurely in case of difference in the feed.

It is the object of this invention to provide a mounting for a pull-off form of die whereby it will be unnecessary to closely cam the screw machine to the pitch of the dies, this mounting permitting a movement of the die head without disengagement sufficient to make up any difference in feed.

Figure 2:
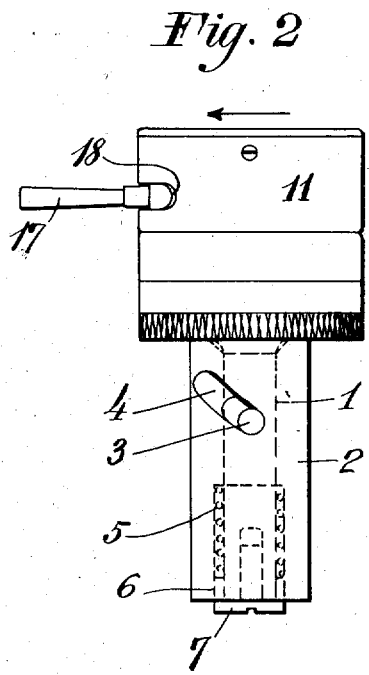

In the accompanying drawings Figure 1 is a sectional view showing the invention applied to a well-known form of pull-off die; and Fig. 2 is an elevation.

1 represents a shank, having a sleeve or bushing 2 thereon, which is engaged with the shank 1 by means of a pin 3 working in a spiral slot 4.

5 represents a coil spring interposed between the sleeve 2 and the shank 1, the spring being held by means of a ring 6 and a screw 7. The die head proper may be of any of the well-known forms now on the market, wherein the die head carrying the dies is moved longitudinally to release the dies, either by releasing a rotatable cam, or by rotating the die head relatively to a stationary cam. In the example of die head herein shown, the latter form is used, wherein the shank 1 is provided with a die carrying head 8 carrying dies 9 which engage with a cam 10 carried through sleeve 11 and screws 12 by the shank 1. The die head 8 carries clutch teeth 13 which engage with a groove in a ring 14, the ring 14 having teeth 15 which engage with a similar slot provided in the forward end of the shank 1. The clutch teeth 13 are held in engagement with the ring 14 by means of springs 16 around the screws 12, so that when the die head 8 carrying the dies 9 with cam 10 and sleeve 11 are moved longitudinally forward, the clutch teeth 13 are disengaged, thereby permitting the die head 8 with the dies 9 to be rotated relatively to the cam 10 to expand the dies and thereby relieve them from engagement with the work. 17 is a resetting handle, carried by the die head 8 and working through a slot 18 in the sleeve 11, so that the die head can be returned to working position and the dies locked as soon as the clutch teeth 13 disengage. A full description of this form of die is found in patent to Mullaney, No. 802,819, dated October 24, 1905, which is not a part of this invention.

Fig. 2 shows the parts in working position, the line of strain during cutting being to the left in the direction of the arrow. At this time it will be seen that the pin 3 will be pushed against the side of the spiral slot 4, which will be without effect longitudinally in disengaging the die head, as the strain of the work will be in the opposite direction. In case the work is not fed to the dies 9 as fast as the dies 9 require, it will be seen that the natural tendency would be for the dies 9 to disengage from the shank at the clutch teeth 13. By means of the spiral slot 4, however, the pin 3 simply moves a slight distance therein, while turning the entire die head a slight angular distance, without disengaging the clutch teeth 13 from the ring 14. This action will occur because, in case the feed cam of the screw machine does not feed the work fast enough, the balance of forces between the rearward thrust of the work and the forward thrust on the shank due to the inclined slot 4 will be disturbed so that the slot 4 will act as a cam and push the entire shank with the dies forward, until the forces again balance. Of course, in practice, it will be seen that in case there is a material lag of the cam, the die head will move gradually in the slot 4. The spring 5 automatically returns the pin 3 to the end of the slot when the dies are disengaged, so that in cutting a thread, the dies will always start at the same position. It is obvious that if opposite threads are to be cut the slot 4 will extend in the opposite direction, and this can be effected by changing the bushing 2 at the same time that the dies 9 are changed. It would still be within the invention to start the pin 3 at the middle of the slot 4, so that in cutting right-hand threads it would move toward one end of the slot, and in cutting left-hand threads it would move toward the opposite end.

It is obvious that this invention can be applied to other types of pull-off dies than the one herein illustrated by way of example, without departing from the invention, and also various modifications and changes in details of construction may be made within the scope of this invention.

Having thus described my invention, I declare that what I claim as new and desire to secure by Letters Patent is:

1. The combination with an expanding machine die movable longitudinally of the shank to release the dies, of means for permitting a differential spiral movement of the die head relatively to the clamping means without releasing the dies.

2. The combination with a die head having expanding dies and means to lock the dies in contracted position, of a shank carrying said die head and a part movable longitudinally to release said locking means, a supporting device for said shank adapted to be clamped in a machine, and a spiral driving connection between said shank and said supporting device for preventing strain on the dies by reason of lag between the feed of the dies and the feed of the work.

3. The combination with a supporting bushing, of a shank, a spiral driving connection between said shank and said bushing constructed to normally hold said parts stationary in driving engagement against the thrust of the work but feeding the shank longitudinally upon variation in the thrust of the work, a die head carried by said shank, expanding dies carried by said die head, means to lock the dies in contracted position and means for releasing said locking means upon longitudinal movement of the die head on the shank.

4. The combination with a shank having expanding die mechanism, means to lock the dies in retracted position and means movable longitudinally of the shank for releasing said locking means, of a support for the shank, and a driving connection between the support and the shank, constructed to normally hold such parts stationary in driving engagement against the thrust of the work but feeding the shank longitudinally upon variation in the thrust of the work.

5. The combination with a die head carrying expanding dies, means to lock the dies in contracted position and a shank connected thereto, means movable longitudinally of the shank for releasing said locking means, of means supporting the shank and connected thereto to permit relative longitudinal and rotational movement, said means being constructed to normally hold such parts stationary in driving engagement against the thrust of the work but feeding the shank longitudinally upon variation in the thrust of the work.

6. The combination with a die head carrying expanding dies, means to lock the dies in contracted position and a shank connected thereto so as to leave relative longitudinal movement with reference thereto to release said locking means, of a sleeve supporting the shank, a pin and spiral slot connections between the shank and sleeve, and spring means tending to hold the shank and sleeve in a determined position, said pin and spiral slot connection being constructed to normally hold such parts stationary in driving engagement against the thrust of the work but feeding the shank longitudinally upon variation in the thrust of the work.

7. A die mechanism, comprising a shank, a head carrying dies movable longitudinally thereon to release the dies, a support carrying said shank, and a cam connection between the shank and support permitting longitudinal feed of the shank and die head without releasing the dies.

8. A die mechanism, comprising a shank, a head carrying dies movable longitudinally thereon to release the dies, a support carrying said shank, a cam connection between the shank and support permitting longitudinal feed of the shank and die head without releasing the dies, and means holding the shank and support in normal position.

In testimony whereof I affix my signature, in presence of two witnesses.

PAUL B. OATMAN.

Witnesses:
J. S. WOOSTER,
G. N. KERR.

---

Corrections in Letters Patent No. 1,045,598.

It is hereby certified that in Letters Patent No. 1,045,598, granted November 26, 1912, upon the application of Paul B. Oatman, of New York, N. Y., for an improvement in "Screw-Cutting Dies," errors appear in the printed specifications requiring correction as follows: Page 2, line 85, for the word "retracted" read *contracted;* same page, line 110, for the word "leave" read *have;* and that the said Letters Patent should be read with these corrections therein that the same may conform to the record of the case in the Patent Office.

Signed and sealed this 17th day of December, A. D., 1912.

[SEAL.]

C. C. BILLINGS,

*Acting Commissioner of Patents.* nally thereon to release the dies, a support carrying said shank, a cam connection between the shank and support permitting longitudinal feed of the shank and die head without releasing the dies, and means holding the shank and support in normal position.

In testimony whereof I affix my signature, in presence of two witnesses.

PAUL B. OATMAN.

Witnesses:
J. S. WOOSTER,
G. N. KERR.

---

Corrections in Letters Patent No. 1,045,598.

It is hereby certified that in Letters Patent No. 1,045,598, granted November 26, 1912, upon the application of Paul B. Oatman, of New York, N. Y., for an improvement in "Screw-Cutting Dies," errors appear in the printed specifications requiring correction as follows: Page 2, line 85, for the word "retracted" read *contracted;* same page, line 110, for the word "leave" read *have;* and that the said Letters Patent should be read with these corrections therein that the same may conform to the record of the case in the Patent Office.

Signed and sealed this 17th day of December, A. D., 1912.

[SEAL.]

C. C. BILLINGS,

*Acting Commissioner of Patents.*

It is hereby certified that in Letters Patent No. 1,045,598, granted November 26, 1912, upon the application of Paul B. Oatman, of New York, N. Y., for an improvement in "Screw-Cutting Dies," errors appear in the printed specifications requiring correction as follows: Page 2, line 85, for the word "retracted" read *contracted;* same page, line 110, for the word "leave" read *have;* and that the said Letters Patent should be read with these corrections therein that the same may conform to the record of the case in the Patent Office.

Signed and sealed this 17th day of December, A. D., 1912.

[SEAL.]                        C. C. BILLINGS,

*Acting Commissioner of Patents.*